UNITED STATES PATENT OFFICE.

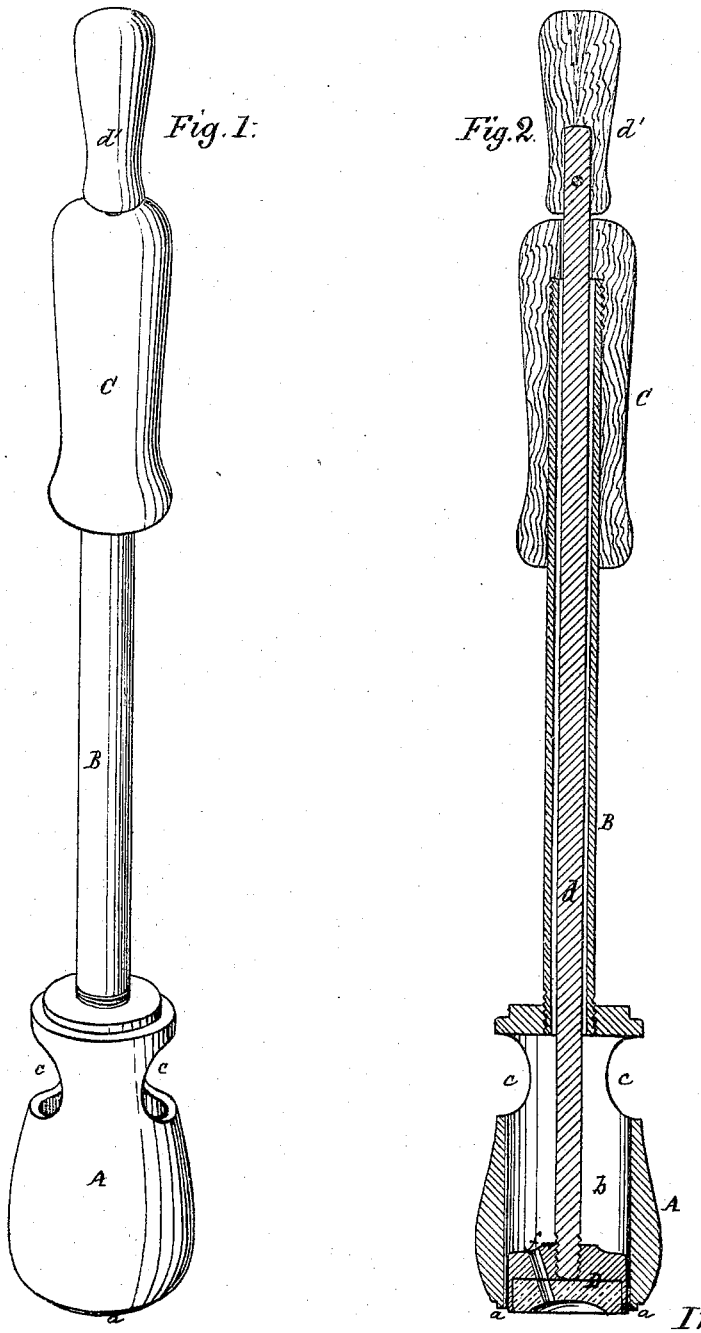

ROBERT J. HOLLINGSWORTH, DECEASED, OF BALTIMORE, MARYLAND, ASSIGNOR, THROUGH HIMSELF AND HIS ADMINISTRATRIX, TO LOUIS McMURRAY, OF SAME PLACE.

IMPROVEMENT IN SOLDERING-TOOLS.

Specification forming part of Letters Patent No. 140,042, dated June 17, 1873; application filed May 2, 1872.

*To all whom it may concern:*

Be it known that I, ROBERT J. HOLLINGSWORTH, of the city and county of Baltimore, and State of Maryland, have invented certain new and useful Improvements in Soldering-Tools, of which the following is a specification:

My invention has reference to that class of tools for soldering caps on cans, in which the soldering-block is provided with an annular flange, adapted to fit around the cap, and upon the solder-ring placed in the groove in the top of the can surrounding the cap. The block usually is made hollow, or has formed within it a chamber to receive the steam and gases which may arise during the soldering operation.

It has been customary heretofore to allow the gas and steam thus generated to escape through the hollow upright stem, or handle, connected with the block; but this has been at times productive of discomfort and annoyance to the workman, and has prevented the tool from being easily handled and used.

To remedy this difficulty I have provided for the discharge or escape of the steam and gas from the block, without passing through the handle, by forming in the block lateral openings communicating with the steam and gas chamber within the same, and it is in this feature that my invention principally consists.

In the accompanying drawing, Figure 1, is a perspective view, and Fig. 2 is a longitudinal central section of a soldering-tool made in accordance with my invention.

The soldering-block is represented at A, provided with an annular solder lip or flange, *a*, and a gas or steam receiving chamber, *b*. Near the top of and in the sides of the block are found one or more openings, *c*, which communicate with chamber *b*, and allow the discharge or escape of whatever gas or steam may be received therein during the soldering operation. Connected with the block is an upright stem, B, provided with a handle, C.

In order to hold the cap in place during the soldering operation I make use of a presser, D, which fits loosely within the chamber *b*, and is held therein by means of a rod, *d*, passing up through the stem B, and provided with a handle or enlarged head, *d'*, which prevents the presser from dropping out of the chamber. The presser is so arranged as to play loosely up and down within the chamber *b*, and one or more perforations, *f*, are formed through it so that the steam or gas from below may pass up into the chamber above.

When the tool, in order to be heated, is placed in a fire-pot of the usual kind, the presser will drop back toward the top of the block, and the openings *c* in this case will serve the additional purpose of keeping the presser comparatively cool.

I do not limit my claim to the particular form of the soldering-block shown in the drawing, nor to any special configuration or number of openings for discharge of gas and steam.

What I claim, and desire to secure by Letters Patent, is—

1. The formation in the soldering-block of one or more lateral openings for the escape of the steam or gas that may accumulate within the block during the soldering operation, substantially as shown and set forth.

2. In combination with a soldering-block formed with one or more lateral openings, as described, a cap-presser arranged to play up and down within the block, and provided with one or more holes for the passage of the steam or gas, during the soldering operation, from below the presser into the chamber above, substantially as shown and set forth.

In testimony whereof I have signed my name to this specification before two subscribing witnesses:

ROBERT J. HOLLINGSWORTH.

Witnesses:
 M. BAILEY,
 EDM. F. BROWN.